United States Patent
Jang

(10) Patent No.: US 9,495,321 B2
(45) Date of Patent: Nov. 15, 2016

(54) APPARATUS FOR RS-232C AND RS-485 SERIAL COMMUNICATION USING COMMON COMMUNICATION PORT

(71) Applicant: LSIS CO., LTD., Anyang-si, Gyeonggi-do (KR)

(72) Inventor: Hyun Woo Jang, Cheonan-si (KR)

(73) Assignee: LSIS CO., LTD., Anyang-si (KR)

( * ) Notice: Subject to any disclaimer, the term of this patent is extended or adjusted under 35 U.S.C. 154(b) by 337 days.

(21) Appl. No.: 14/178,757

(22) Filed: Feb. 12, 2014

(65) Prior Publication Data

US 2014/0281074 A1 Sep. 18, 2014

(30) Foreign Application Priority Data

Mar. 18, 2013 (KR) .................. 10-2013-0028455

(51) Int. Cl.
G06F 13/42 (2006.01)
G06F 13/38 (2006.01)

(52) U.S. Cl.
CPC ......... *G06F 13/4282* (2013.01); *G06F 13/387* (2013.01)

(58) Field of Classification Search
CPC ........... G06F 13/4247; G06F 13/4282; G06F 13/387
See application file for complete search history.

(56) References Cited

U.S. PATENT DOCUMENTS 6,535,938 B1 * 3/2003 Teramura ............ G06F 13/4247
180/169

FOREIGN PATENT DOCUMENTS

| CN | 1455489 | 11/2003 |
|---|---|---|
| CN | 101662369 | 3/2010 |
| CN | 201805241 | 4/2011 |
| KR | 10-2004-0076382 | 9/2004 |
| KR | 10-2012-0025648 | 3/2012 |

OTHER PUBLICATIONS

State Intellectual Property Office of the People's Republic of China Application Serial No. 201410101529.2, Office Action dated Jul. 6, 2016, 9 pages.

* cited by examiner

*Primary Examiner* — Ernest Unelus

(74) *Attorney, Agent, or Firm* — Lee Hong Degerman Kang & Waimey

(57) ABSTRACT

Proposed is an apparatus for RS-232C and RS-485 serial communication using common communication port configured to selectively use a communication by RS-232C and RS-485 communication methods without change in external wirings by performing the RS-232C and RS-485 communications using a common communication port, the apparatus including a communication converter configured to transmit a data using mutually different communication methods through a common port in response to a provided communication method selection signal, or receiving a data from outside, and a controller configured to provide the communication method selection signal and the transmission data to the communication converter in response to a set parameter, and to receive the data transmitted from outside through the communication converter.

7 Claims, 6 Drawing Sheets

FIG. 5

| SELECTION SIGNAL | INPUT SIGNAL | OUTPUT SIGNAL |
|---|---|---|
| High (RS-232C) | A | C |
| | B | D |
| Low (RS-485) | A | D |
| | B | C |

FIG. 7

| COMMUNICATION CHANNEL 1 | COMMUNICATION CHANNEL 2 | SELECTION SIGNAL 1 | SELECTION SIGNAL 2 | TRANSMISSION CONTROL SIGNAL 1 | TRANSMISSION CONTROL SIGNAL 2 |
|---|---|---|---|---|---|
| RS-232C | RS-232C | High | High | Low | Low |
| RS-485 (RECEPTION) | RS-232C | Low | High | Low | Low |
| RS-485 (TRANSMISSION) | | Low | High | High | Low |
| RS-485 (RECEPTION) | RS-485 (RECEPTION) | Low | Low | High | Low |
| RS-485 (TRANSMISSION) | RS-485 (TRANSMISSION) | Low | Low | Low | High |

APPARATUS FOR RS-232C AND RS-485 SERIAL COMMUNICATION USING COMMON COMMUNICATION PORT

CROSS-REFERENCE TO RELATED APPLICATION

Pursuant to 35 U.S.C. §119(a), this application claims the benefit of earlier filing date and right of priority to Korean Application No. 10-2013-0028455, filed on Mar. 18, 2013, the contents of which is incorporated by reference herein in its entirety.

BACKGROUND OF THE INVENTION

1. Field of the Invention

Exemplary aspects of the present disclosure relate to a serial communication apparatus, and more particularly to an apparatus for RS-232C and RS-485 serial communication using common communication port configured to selectively use a communication by two methods without change in external wirings by performing the RS-232C and RS-485 communications using a common communication port.

2. Description of Related Art

A serial communication is widely used in various fields including a PLC (Programmable Logic Controller), and the serial communication is generally implemented using RS-232C or RS-485 serial communication method.

FIG. 1 is a block diagram illustrating an example of a serial communication apparatus disposed with one RS-232C channel and one RS-485 channel, where communication with an external communication apparatus is implemented using an embedded UART (Universal Asynchronous Receiver/Transmitter) of an MPU (Micro Processor Unit, 11), an RS-232C driver (12) and an RS-485 driver (13), and an RS-485+ signal and an RS-485− signal are created and transmitted to output ports when a transmission control signal is high, and received data is transmitted to an MPU (Micro Processor Unit, 11) via an input port when the transmission control signal is low.

That is, a signal in channel 1 is converted to a RS-232C level via the RS-232C driver (12) to perform an RS-232C communication, and a signal in channel 2 is converted to an RS-485 level via the RS-485 driver (13) to perform an RS-485 communication. At this time, the channel 1 can implement the communication using only the RS-232C method, and the channel 2 can implement the communication using only the RS-485 method, because a signal level of the RS-232C method and a signal level of RS-485 method are different.

As noted from the foregoing, because each terminal of communication ports is functionally fixed according to a communication method, RS-232C communication channel and RS-485 communication channel are fixed in the hardware manner, whereby several types of communication modules are required depending on used communication methods.

Furthermore, the prior art suffers from various disadvantages and problems in that types of communication modules must be changed in order to change a channel using an RS-232C method to a channel using an RS-485 method, or to change a channel using an RS-485 method to a channel using an RS-232C method, and wirings of each terminal must be replaced, to name a few.

SUMMARY OF THE INVENTION

Exemplary aspects of the present disclosure are to substantially solve at least the above problems and/or disadvantages and to provide at least the advantages as mentioned below. Thus, the present disclosure is directed to provide an apparatus for serial communication configured to conveniently use a serial communication by changing an RS-232C channel and an RS-485 channel without changing hardware or wirings of terminals.

It should be emphasized, however, that the present disclosure is not limited to a particular disclosure, as explained above. It should be understood that other technical subjects not mentioned herein may be appreciated by those skilled in the art.

In one general aspect of the present disclosure, there is provided an apparatus for serial communication (hereinafter referred to as serial communication apparatus, or simply as apparatus) configured to perform a serial communication through mutually different communication methods, the apparatus comprising:

a communication converter configured to transmit a data using mutually different serial communication methods through a common port in response to a provided communication method selection signal, or receiving a data from outside; and a controller configured to provide the communication method selection signal and the transmission data to the communication converter in response to a set parameter, and to receive the data transmitted from outside through the communication converter.

Preferably, but not necessarily, the mutually different serial communication method may be an RS-232C communication method and an RS-485 communication method.

Preferably, but not necessarily, the communication converter may include a driver configured to perform communication using the RS-232C communication method or the RS-485 communication method, a switching unit configured to provide the data to the controller by selectively switching the data received through the driver from the outside using the RS-232C communication method or the RS-485 communication method in response to the selection signal from the controller, or to selectively switch the data to allow the transmitted data to be transmitted to outside through the RS-232C communication method or the RS-485 communication method, and a communication port controller configured to activate or deactivate the driver in response to the selection signal, and to control transmission/reception operation of data in response to control of the controller.

Preferably, but not necessarily, the driver may include an RS-232C driver configured to perform a communication in response to an RS-232C communication method, and an RS-485 driver configured to perform a communication in response to an RS-485 communication method.

Preferably, but not necessarily, the switching unit may selectively switch at least one signal from a signal received from outside through the RS-232C driver and a signal received from outside through the RS-485 driver.

Preferably, but not necessarily, the communication port controller may include an RS-232C controller configured to activate or deactivate the RS-232C driver in response to a channel selection signal of the controller, and an RS-485 controller configured to control transmission/reception operation of the RS-485 driver in response to a data transmission control signal provided from the controller.

Preferably, but not necessarily, the RS-232C driver and the RS-485 driver may be commonly connected to a communication port of a selected channel.

Preferably, but not necessarily, the switching unit may select a signal received from outside through the RS-232C driver when the selected signal is in a high state, and may select a signal received from outside through the RS-485 driver when the selected signal is in a low state.

Preferably, but not necessarily, the RS-232C controller may reverse the selection signal of the controller and may transmit as activation signal/deactivation signal of the RS-232C driver.

Preferably, but not necessarily, the RS-485 controller may perform an AND operation on the signal reversed from the selection signal of the controller and on the transmission control signal, and may transmit an AND-operated signal to the RS-485 driver.

In an advantageous effect of the serial communication apparatus according to the exemplary embodiments of the present disclosure, a same communication port (terminal) can be commonly used by the apparatus to perform an RS-232C communication or an RS-485 communication, and a communication channel can be changed to an RS-232C channel or an RS-485 channel and used by a simple parameter set-up to thereby dispense with change of hardware or wiring of terminals, whereby a serial communication can be conveniently processed.

BRIEF DESCRIPTION OF THE DRAWINGS

The present disclosure may best be understood by reference to the following description taken in conjunction with the accompanying drawings, in which:

FIG. 5 is a table explaining a switching operation of a switching unit of FIG. 4 according to an exemplary embodiment of the present disclosure;

FIG. 7 is a table explaining operation of the serial communication apparatus of FIG. 6.

DETAILED DESCRIPTION OF PREFERRED EMBODIMENTS

Now, exemplary embodiments of the present disclosure will be described in detail with reference to the accompanying drawings. The present disclosure is herein described, by way of example only, with reference to the accompanying drawings. The present disclosure is presented in the cause of providing what is believed to be the most useful and readily understood description of the principles and conceptual aspects of the disclosure. In this regard, no attempt is made to show structural details of the disclosure in more detail than is necessary for a fundamental understanding of the disclosure and the description is taken with the drawings making apparent to those skilled in the art how the several forms of the disclosure may be embodied in practice.

Figure 1:
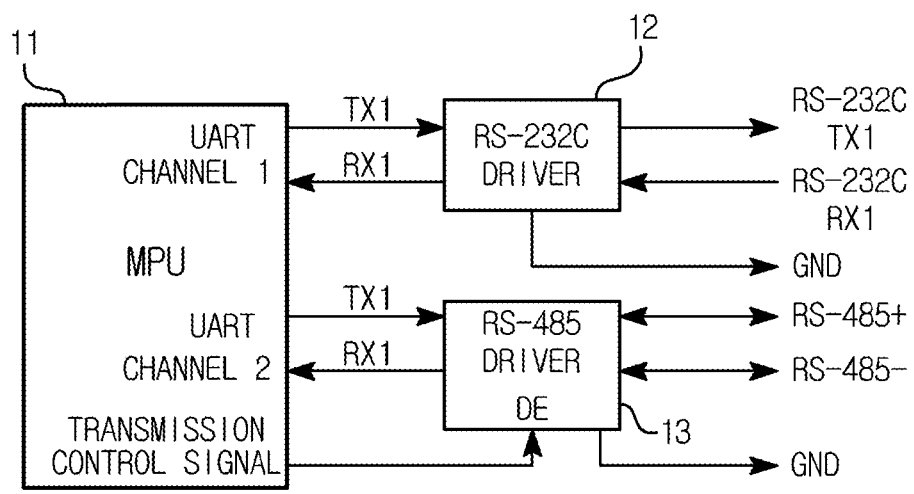
FIG. 1 is a block diagram illustrating an exemplary configuration of a serial communication apparatus having an RS-232C communication channel and an RS-485 communication channel according to prior art.
Figure 2:
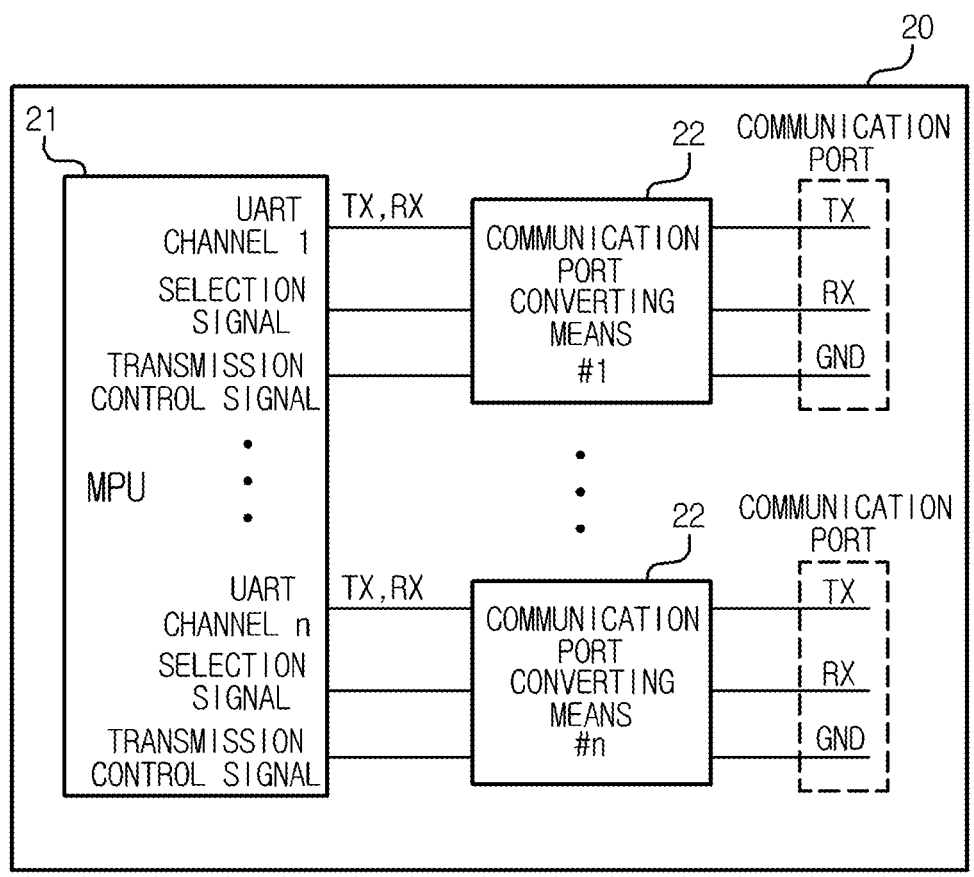
FIG. 2 is a schematic block diagram illustrating a configuration of a serial communication apparatus according to the present disclosure.

FIG. 2 is a schematic block diagram illustrating a configuration of a serial communication apparatus according to the present disclosure.

Referring to FIG. 2, a serial communication apparatus (20) includes communication port converting means (22), where the apparatus (20) performs a communication through the communication port converting means (22) configured to correspond to at least one channel. That is, when the apparatus (20) is formed with n number of channels, n number of communication port converting means (22) configured to correspond to each channel a one-on-one base is formed.

The apparatus (20) may be variably configured to perform a communication using an RS-232C communication method and an RS-485 communication method, where an overall operation of the apparatus is generally controlled by an MPU (Micro Processor Unit, 21). The MPU (21) transmits data received from outside to the communication port converting means (22), receives the data received from the outside through the communication port converting means (22), and processes the data, outputs a selection signal and a transmission control signal in response to a set parameter and controls the operation of the communication port converting means (22).

Figure 3:
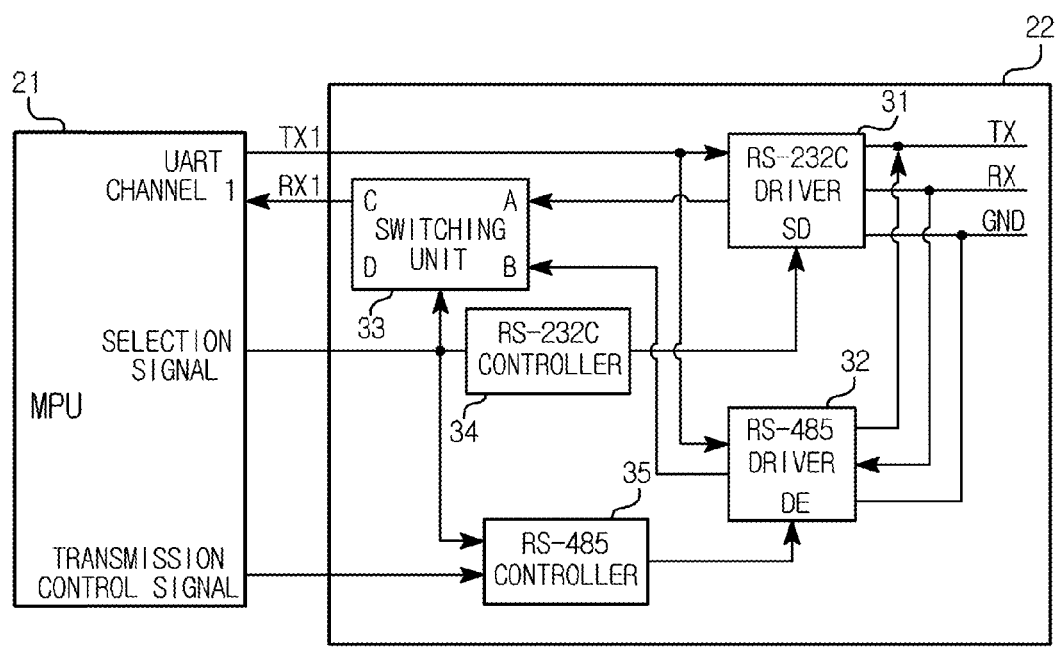
FIG. 3 is a detailed block diagram illustrating a communication port converting means illustrated in FIG. 2.

FIG. 3 is a detailed block diagram illustrating the communication port converting means (22) illustrated in FIG. 2, where the communication port converting means (22) includes an RS-232C driver (31) configured to perform a communication in response to an RS-232C communication method, and an RS-485 driver (32) configured to perform a communication in response to an RS-485 communication method.

The RS-232C driver (31) and the RS-485 driver (32) are commonly connected to a communication port of a relevant channel, whereby there is no need to change a wiring in response to a communication method, because a terminal of communication port is commonly used.

A switching unit (33) selects one of a signal received from outside through the RS-232C driver (31) in response to a selection signal of the relevant channel, and a signal received from outside through the RS-485 driver (32) and transmits the signal to the MPU (21). For example, the switching unit (33) may select a signal received from outside through the RS-232C driver (31) when the selected signal is in a high state, and selects a signal received from outside through the RS-485 driver (32) when the selected signal is in a low state, and transmits the signal to the MPU (21).

Figure 4:
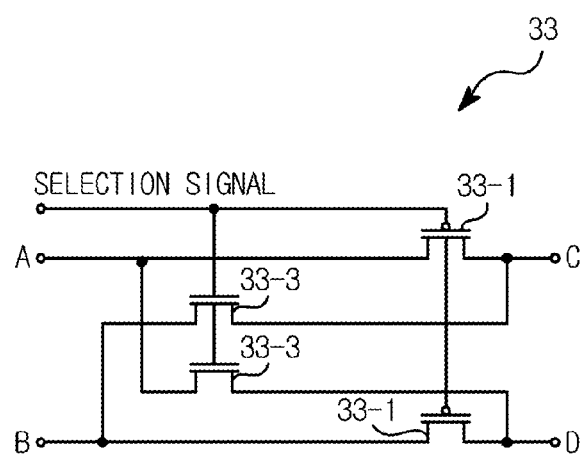
FIG. 4 is a detailed circuit diagram illustrating a switching unit of FIG. 3.

FIG. 4 is a detailed circuit diagram illustrating a switching unit of FIG. 3, where each terminal A, B and C of the switching unit (33) is connected to a reception signal output terminal of the RS-232C driver (31), a reception signal output terminal of the RS-485 driver (32) and a reception signal input terminal of the MPU (21), and where a terminal D may not be particularly connected.

The selection signal is commonly applied to a gate terminal of a first PMOS (P-channel Metal Oxide Semiconductor) device (33-1), a second PMOS device (33-2), a first NMOS (N-channel Metal Oxide Semiconductor) device (33-3) and a second NMOS device (33-4), A drain and a source of the first PMOS (33-1) are respectively connected to terminals A and C, a drain and a source of the second PMOS (33-2) are respectively connected to terminals B and D, a drain and a source of the first NMOS (33-3) are respectively connected to terminals B and C, and a drain and a source of the second NMOS (33-4) are respectively connected to terminals A and D. That is, the selection signal connects any one of terminals A and B to the terminal C for connection to the MPU (21).

FIG. 5 is a table explaining a switching operation of a switching unit of FIG. 4 according to an exemplary embodiment of the present disclosure in which a connected relationship of each terminal in response to the selection signal is shown.

Referring to FIG. 5, the terminals A and C are connected when the selection signal is in a high state to allow a signal received from outside through the RS-232C driver (31) to be transmitted to the MPU (21), where an RS-485 signal of the terminal B is outputted to the terminal D and disposed of Hence, there is no collision of two signals, because only one signal from the signals through the RS-232C driver (31) and the RS-485 driver (32) is transmitted to the MPU (21).

An RS-232C controller (34) illustrated in FIG. 3 activates or deactivates the RS-232C driver (31) in response to a selection signal of a relevant channel. The RS-232C driver (31) may be activated to perform an RS-232C communication when a SD (Shut Down) signal is in a low state, and may be deactivated to perform an RS-232C communication when the SD (Shut Down) signal is in a high state.

At this time, the RS-232C controller (34) may be formed by using an inverter device configured to reverse a selection signal and to be transmitted as activation/deactivation signal (SD signal) of the RS-232C driver when the selection signal for performing the RS-232C communication is a high signal. A RS-485 controller (34) controls the RS-485 driver (32) in response to a transmission control signal of a relevant channel. For example, the RS-485 driver (32) may be so formed as to interrupt an output operation by making an output port turn into a high impedance state, when a DE (Driver Enable) signal is in a low state, and to receive a signal from outside when the DE signal is in a high state.

The RS-485 controller (35) performs an AND operation on the signal reversed from the selection signal of the controller and on the transmission control signal, and transmits AND-operated signal to the RS-485 driver (32) when a transmission control signal for performing the RS-485 reception operation is high, a transmission control signal for transmission operation is low.

As noted from the foregoing, the transmission signals must not collide, because a signal line (Tx) of a communication port configured to output data to an outside is commonly connected to output terminals of the RS-232C driver (31) and the RS-485 driver (32), such that a selection signal and a transmission control signal for selectively performing the RS-232C communication and the RS-485 communication may be interconnected.

Figure 6:
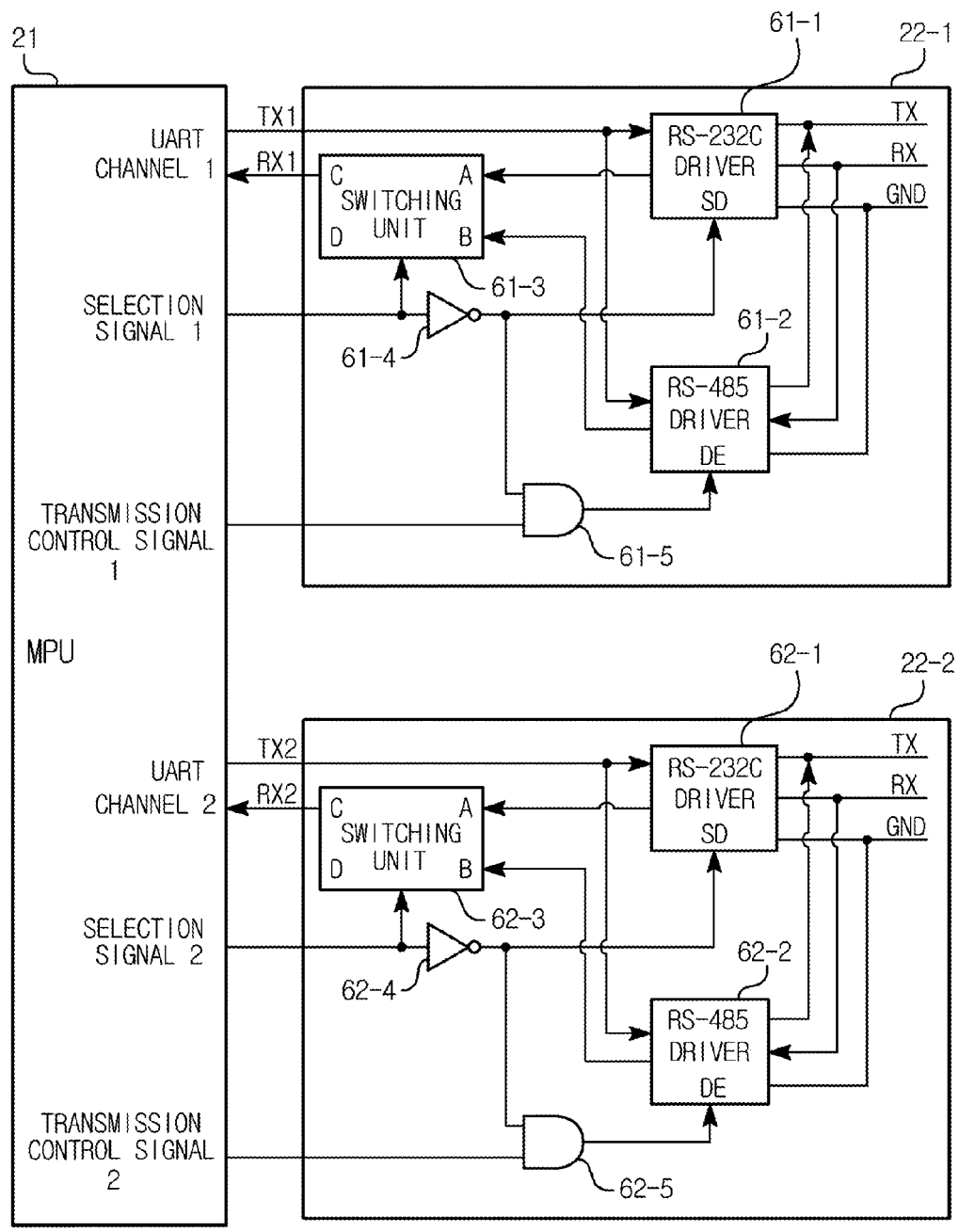
FIG. 6 is a block diagram illustrating a configuration in which a serial communication apparatus uses two channels according to the present disclosure.

FIG. 6 is a block diagram illustrating a configuration in which a serial communication apparatus uses two channels according to the present disclosure, where communication port converting means (22-1, 22-2) that correspond to a channel 1 and a channel 2 may be formed, and the MPU (21) transmits a selection signal and a transmission control signal to each channel.

When the selection signal 1 is in a low state, an SD signal of an RS-232C driver (61-1) turns into a low state, such that the an RS-232C driver (61-1) performs a normal operation, where a terminal A and a terminal C of a switching unit (61-3) in channel 1 are connected. When a selection signal 1 is in a high state, and because a DE signal of an RS-485 driver (61-2) is always in a low state, an output of the RS-485 driver (61-2) is interrupted.

That is, a DE signal turns into a low state regardless of transmission control signal 1, and an output terminal of the RS-485 driver (61-2) turns into a high impedance state to give no influence to data communication through the RS-232C driver (61-1), because an output of an inverter device (61-4) configured to perform the function of RS-232C controller is inputted into an AND element (61-5) that performs the function of an RS-485 controller).

The RS-232C driver (61-1) becomes deactivated to allow terminals B and C of a switching unit (61-3) at channel 1 to be connected, because an SD signal of the RS-232C driver (61-1) turns into a high state when a selection signal 1 is in a low state. When a selection signal 1 is in a low state, and a transmission control signal 1 is in a high state, a DE signal of the RS-485 driver (61-2) turns into a high state, an RS-485 transmission operation is implemented. When a transmission control signal 1 is in a low state, a DE signal of the RS-485 driver (61-2) turns into a low state, an RS-485 transmission operation is interrupted and only a receiving operation is enabled. That is, the RS-485 driver (61-2) operates as a receiving driver, when the selection signal 1 is in a low state and the transmission control signal 1 is in a low state, and operates as a transmitting driver when the transmission control signal 1 is in a high state.

The RS-232C driver (61-1) performs a normal operation, because the SD signal of RS-232C driver (61-1) in channel 2 is in a low state when the selection signal 2 is in a high state, and terminals A and C of a switching unit (61-3) of channel 2 are connected. An output of RS-485 driver (62-2) is interrupted, because a DE signal of RS-485 driver (62-2) is always in a low state, when the selection signal 2 is in a low state. That is, the DE signal turns into a low state regardless of transmission control signal 2, because an output of an inverter device (62-4) functioning as the RS-232C controller is inputted into an AND element (that functions as the RS-485 controller, 62-5), and an output terminal of RS-485 driver (62-2) turns into a high impedance state to give no influence to transmission through the RS-232C driver (62-1).

The RS-232C driver (61-1) is deactivated, because the SD signal of RS-232C driver (61-1) turns into a low state, when the selection signal 2 is in a low state, whereby terminals B and C of switching unit (62-3) of channel 2 are connected.

The RS-485 transmission operation is implemented, because the DE signal of the RS-485 driver (62-2) turns into a high state, when a selection signal 2 is in a low state, and a transmission control signal 2 is in a high state, and the RS-485 transmission operation is interrupted and only receiving operation is enabled, because the DE signal of RS-485 driver (62-2) turns into a low state, when the transmission control signal 2 is in a low state.

That is, the RS-485 driver (62-2) of channel 2 operates as a receiving driver, when the selection signal 2 is in a low state, and the transmission control signal 2 is in a low state, and operates as a transmitting driver when the transmission control signal 2 is in a high state.

Now, referring to FIG. 7, operations of channels 1 and 2 will be explained, where FIG. 7 is a table explaining operation of the serial communication apparatus of FIG. 6.

Referring to FIG. 7, all the channels 1 and 2 perform the RS-232C communication when the selection signal 1, selection signal 2, transmission control signal 1 and transmission control signal 2 are in high, high, low and low states respectively.

The RS-485 reception is implemented through the channel 1, and the RS-232C communication is implemented through the channel 2, when the selection signal 1, selection signal 2, transmission control signal 1 and transmission control signal 2 are in low, high, low and low states respectively.

The RS-485 transmission is implemented through the channel 1, and the RS-232C communication is implemented through the channel 2, when the selection signal 1, the selection signal 2, the transmission control signal 1 and the transmission control signal 2 are in low, high, high and low states respectively.

The RS-485 reception is implemented through the channels 1 and 2, when the selection signal 1, selection signal 2, transmission control signal 1 and transmission control signal 2 are in low, low, low and low states respectively.

The RS-485 transmission is implemented through the channel 1 and 2.

When the selection signal 1, selection signal 2, transmission control signal 1 and transmission control signal 2 are in low, low, high and high states respectively, Although exemplary embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

What is claimed is:

1. An apparatus for serial communication configured to perform a serial communication through mutually different communication methods, the apparatus comprising:
   a communication converter configured to transmit a data using mutually different serial communication methods through a common port in response to a provided communication method selection signal, or receiving a data from outside; and
   a controller configured to provide the communication method selection signal and the transmission data to the communication converter in response to a set parameter, and to receive the data transmitted from outside through the communication converter,
   wherein the mutually different serial communication methods comprise an RS-232C communication method and an RS-485 communication method, and
   the communication converter includes:
   a RS-232C driver configured to perform communication using the RS-232C communication method and a RS-485 driver configured to perform communication using the RS-485 communication method;
   a switching unit configured to provide the data to the controller and to outside by selectively switching between the RS-232C driver and the RS-485 driver; and
   a communication port controller configured to activate and deactivate the RS-232C driver and the RS-485 driver respectively in response to the selection signal, and to control transmission/reception operation of data in response to a control signal of the controller,
   wherein the communication port controller includes an RS-232C controller configured to activate and deactivate the RS-232C driver in response to the selection signal of the controller, and an RS-485 controller configured to control transmission/reception operation of the RS-485 driver in response to the control signal provided from the controller.

2. The apparatus of claim 1, wherein the switching unit provides the data to the controller by selectively switching the data received through the driver from the outside using the RS-232C communication method or the RS-485 communication method in response to the selection signal from the controller, or selectively switch to allow a data to be transmitted to the outside through the RS-232C communication method or the RS-485 communication method.

3. The apparatus of claim 2, wherein the switching unit selectively switches at least one signal from a signal received from the outside through the RS-232C driver and a signal received from the outside through the RS-485 driver.

4. The apparatus of claim 2, wherein the RS-232C driver and the RS-485 driver are commonly connected to a communication port of a selected channel.

5. The apparatus of claim 2, wherein the switching unit selects a signal received from the outside through the RS-232C driver when the selection signal is in a high state, and selects a signal received from the outside through the RS-485 driver when the selected signal is in a low state.

6. The apparatus of claim 1, wherein the RS-232C controller reverses the selection signal of the controller and transmits as an activation signal/deactivation signal of the RS-232C driver.

7. The apparatus of claim 1, wherein the RS-485 controller performs an AND operation on a signal reversed from the selection signal of the controller and on the data transmission control signal, and transmits an AND-operated signal to the RS-485 driver.

* * * * *